(12) United States Patent
Lee et al.

(10) Patent No.: US 10,996,387 B2
(45) Date of Patent: May 4, 2021

(54) OPTICAL DEVICE

(71) Applicant: LG Chem, Ltd., Seoul (KR)

(72) Inventors: Seong Min Lee, Daejeon (KR); Young Shin Lee, Daejeon (KR); Byoung Kun Jeon, Daejeon (KR); In Ju Mun, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/969,394

(22) PCT Filed: May 31, 2019

(86) PCT No.: PCT/KR2019/006560
§ 371 (c)(1),
(2) Date: Aug. 12, 2020

(87) PCT Pub. No.: WO2019/240414
PCT Pub. Date: Dec. 19, 2019

(65) Prior Publication Data
US 2021/0055463 A1 Feb. 25, 2021

(30) Foreign Application Priority Data
Jun. 12, 2018 (KR) .................. 10-2018-0067624

(51) Int. Cl.
*G02F 1/137* (2006.01)
*G02B 5/30* (2006.01)
(Continued)

(52) U.S. Cl.
CPC ....... *G02B 5/3016* (2013.01); *G02F 1/13725* (2013.01); *G02F 1/133528* (2013.01); *G02F 1/133711* (2013.01)

(58) Field of Classification Search
None
See application file for complete search history.

(56) References Cited

U.S. PATENT DOCUMENTS

2005/0068629 A1 3/2005 Fernando et al.
2006/0066787 A1 3/2006 Yoda et al.
(Continued)

FOREIGN PATENT DOCUMENTS

EP 1933181 A1 6/2008
KR 20060035404 A 4/2006
(Continued)

OTHER PUBLICATIONS

International Search Report for Application No. PCT/KR2019/006560 dated Sep. 10, 2019, 2 pages.

*Primary Examiner* — James A Dudek
(74) *Attorney, Agent, or Firm* — Lerner, David, Littenberg, Krumholz & Mentlik, LLP

(57) ABSTRACT

An optical device and method of manufacturing the same are disclosed herein. In some embodiments, an optical device includes a first outer substrate and a second outer substrate disposed opposite to each other, a liquid crystal element disposed between the first and second outer substrates; and a plurality of adhesive films encapsulating the liquid crystal element, wherein the plurality of adhesive films comprises a curable adhesive film and a non-curable adhesive film. The optical device is capable of varying transmittance and reducing light loss while improving appearance defects. Such an optical device can be used for various applications such as eyewear, for example, sunglasses or augmented reality (AR) or virtual reality (VR) eyewear, an outer wall of a building or a sunroof for a vehicle.

18 Claims, 3 Drawing Sheets

(51) Int. Cl.
 *G02F 1/1335* (2006.01)
 *G02F 1/1337* (2006.01)

(56) References Cited

U.S. PATENT DOCUMENTS

| | | |
|---|---|---|
| 2007/0279739 A1 | 12/2007 | You et al. |
| 2012/0020056 A1* | 1/2012 | Yamagata ......... G02F 1/133308 362/97.1 |
| 2016/0085131 A1 | 3/2016 | Lam et al. |
| 2018/0284536 A1 | 10/2018 | Lee et al. |
| 2019/0250465 A1 | 8/2019 | Kim et al. |

FOREIGN PATENT DOCUMENTS

| | | |
|---|---|---|
| KR | 20060087600 A | 8/2006 |
| KR | 100717100 B1 | 5/2007 |
| KR | 20070116437 A | 12/2007 |
| KR | 20080064803 A | 7/2008 |
| KR | 101612228 B1 | 4/2016 |
| KR | 20170047972 A | 5/2017 |
| KR | 20180046871 A | 5/2018 |

* cited by examiner

[Figure 1]
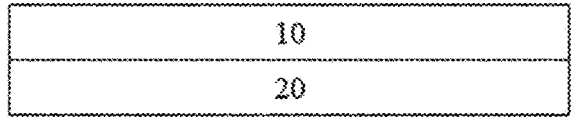
[Figure 2]
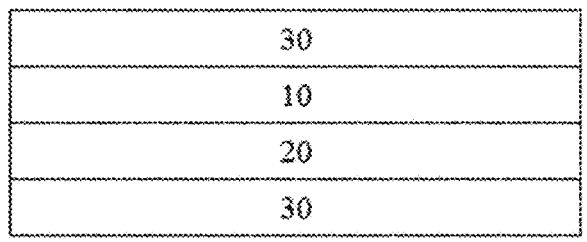
[Figure 3]
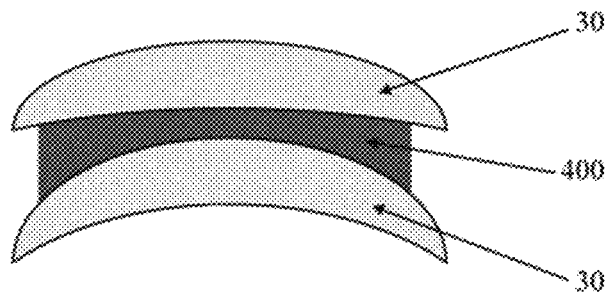
[Figure 4]
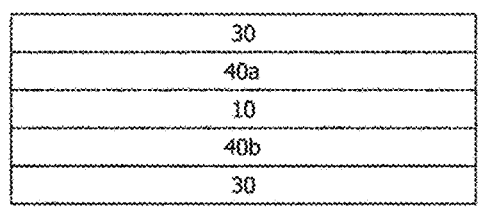
[Figure 5]
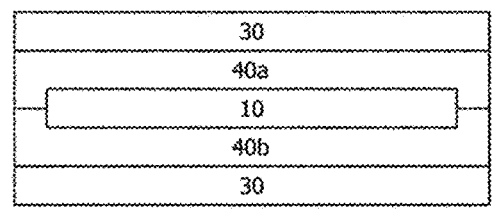

[Figure 6]
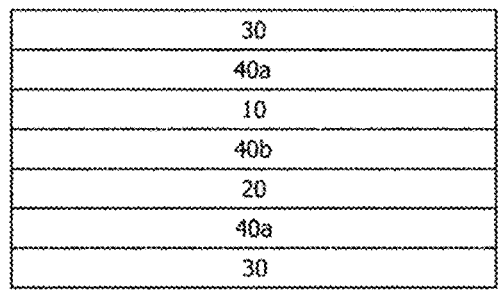
[Figure 7]
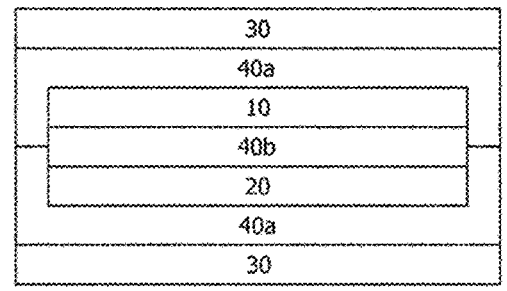
[Figure 8]
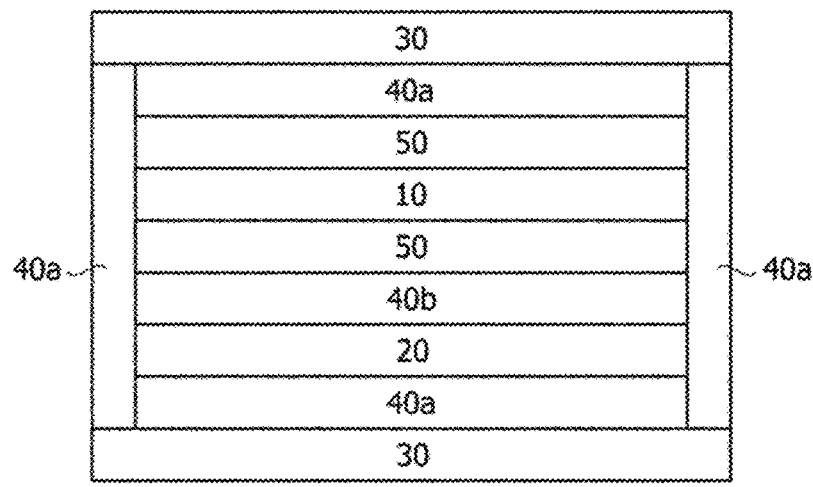

[Figure 9A] [Figure 9B]

OPTICAL DEVICE

CROSS-REFERENCE TO RELATED APPLICATION(S)

The present application is a national phase entry under 35 U.S.C. § 371 of International Application No. PCT/KR2019/006560, filed on May 31, 2019, which claims the benefit of priority from Korean Patent Application No. 10-2018-0067624, filed on Jun. 12, 2018, the disclosures of which are incorporated by reference herein.

TECHNICAL FIELD

The present application relates to an optical device.

BACKGROUND ART

Various optical devices are known, which are designed so that transmittance can be varied using liquid crystal compounds.

For example, transmittance-variable devices using a so-called GH cell (guest host cell), to which a mixture of a host material and a dichroic dye guest is applied, are known, and in the device, a liquid crystal compound is mainly used as the host material.

Such transmittance-variable devices are applied to various applications including eyewear such as sunglasses and eyeglasses, outward walls of a building or sunroofs of a vehicle, and the like.

BRIEF DESCRIPTION OF DRAWINGS

FIG. 1 depicts an optical device in accordance with an embodiment of the present disclosure.

FIG. 2 depicts an optical device in accordance with an embodiment of the present disclosure.

FIG. 3 depicts an optical device in accordance with an embodiment of the present disclosure.

FIG. 4 depicts an optical device in accordance with an embodiment of the present disclosure.

FIG. 5 depicts an optical device in accordance with an embodiment of the present disclosure.

FIG. 6 depicts an optical device in accordance with an embodiment of the present disclosure.

FIG. 7 depicts an optical device in accordance with an embodiment of the present disclosure.

FIG. 8 depicts an optical device in accordance with an embodiment of the present disclosure.

FIGS. 9A-B depict optical devices of Example 1 and Comparative Example 1, respectively.

DISCLOSURE

Technical Problem

The present application provides an optical device capable of varying transmittance and reducing light loss while improving appearance defects.

Technical Solution

The present application is an optical device capable of adjusting transmittance, which relates to, for example, an optical device capable of switching at least between a transparent mode and a black mode.

The transparent mode is a state where the optical device exhibits relatively high transmittance, and the black mode is a state where the optical device exhibits relatively low transmittance.

In one example, the optical device may have transmittance in the transparent mode of about 30% or more, 35% or more, 40% or more, 45% or more, or about 50% or more. Also, the optical device may have transmittance in the black mode of about 20% or less, 15% or less, or about 10% or less.

The higher the transmittance in the transparent mode is, the more advantageous it is, and the lower the transmittance in the black mode is, the more advantageous it is, so that each of the upper limit and the lower limit is not particularly limited. In one example, the upper limit of the transmittance in the transparent mode may be about 100%, 95%, 90%, 85%, 80%, 75%, 70%, 65% or about 60%. The lower limit of the transmittance in the black mode may be about 0%, 1%, 2%, 3%, 4%, 5%, 6%, 7%, 8%, 9%, or about 10%.

The transmittance may be linear light transmittance. The term linear light transmittance may be a ratio of, relative to light which is incident on the optical device in a predetermined direction, light (linear light) transmitted through the optical device in the same direction as the incident direction. In one example, the transmittance may be a result of measurement (normal light transmittance) with respect to light incident in a direction parallel to the surface normal of the optical device.

In the optical device of the present application, the light whose transmittance is controlled may be UV-A region ultraviolet light, visible light or near-infrared light. According to a commonly used definition, the UV-A region ultraviolet light is used to mean radiation having a wavelength in a range of 320 nm to 380 nm, the visible light is used to mean radiation having a wavelength in a range of 380 nm to 780 nm and the near-infrared light is used to mean radiation having a wavelength in a range of 780 nm to 2000 nm.

The optical device of the present application is designed to be capable of switching at least between the transparent mode and the black mode. If desired, the optical device may also be designed to be capable of implementing other modes besides the transparent mode and the black mode. For example, it may also be designed to be capable of implementing a third mode which may represent any transmittance between the transmittance of the transparent mode and the transmittance of the black mode.

For example, the switching between such modes can be achieved, as the optical device comprises a liquid crystal element. Here, the liquid crystal element is a liquid crystal element capable of switching between at least two or more optical axis oriented states, for example, first and second oriented states. Here, the optical axis may mean the long axis direction when the liquid crystal compound included in the liquid crystal element is a rod type, and may mean the normal direction of the disc plane when it is a discotic type. On the other hand, when the liquid crystal element comprises a plurality of liquid crystal compounds having optical axis directions different from each other in any oriented state, the optical axis of the liquid crystal element may be defined as an average optical axis, and in this case, the average optical axis may mean the vector sum of the optical axes of the liquid crystal compounds.

The oriented state in such a liquid crystal element can be changed by applying energy, for example, by applying a voltage. That is, the liquid crystal element may have any one of the first and second oriented states in a state without voltage application, and may be switched to another oriented state when a voltage is applied.

The black mode may be implemented in any one of the first and second oriented states, and the transparent mode may be implemented in another oriented state. For convenience, in this specification, it is described that the black mode is implemented in the first oriented state, unless otherwise specified.

The liquid crystal element may comprise a liquid crystal layer containing at least a liquid crystal compound. In one example, the liquid crystal layer is a so-called guest host liquid crystal layer, which may be a liquid crystal layer comprising a liquid crystal compound and a dichroic dye guest.

The liquid crystal layer is a liquid crystal layer using a so-called guest host effect, which is a liquid crystal layer in which the dichroic dye guest is aligned according to an alignment direction of the liquid crystal compound (hereinafter, may be referred to as a liquid crystal host). The alignment direction of the liquid crystal host may be adjusted depending on whether or not external energy is applied.

The type of the liquid crystal host used in the liquid crystal layer is not particularly limited, and a general type of liquid crystal compound applied to realize the guest host effect can be used.

For example, as the liquid crystal host, a smectic liquid crystal compound, a nematic liquid crystal compound or a cholesteric liquid crystal compound can be used. In general, a nematic liquid crystal compound can be used. The term nematic liquid crystal compound means a liquid crystal compound that liquid crystal molecules have no regularity with respect to positions but all can be arranged in order along the molecular axis direction. Such a liquid crystal compound may be in a rod form or may be in a discotic form.

As such a nematic liquid crystal compound, one having a clearing point of, for example, about 40° C. or more, 50° C. or more, 60° C. or more, 70° C. or more, 80° C. or more, 90° C. or more, 100° C. or more, or about 110° C. or more, or having a phase transition point in the above range, that is, a phase transition point to an isotropic phase on a nematic phase, can be selected. In one example, the clearing point or phase transition point may be about 160° C. or less, 150° C. or less, or about 140° C. or less.

The liquid crystal compound may have dielectric constant anisotropy of a negative number or a positive number. The absolute value of the dielectric constant anisotropy can be appropriately selected in consideration of the object. For example, the dielectric constant anisotropy may be more than about 3, or more than about 7, or may be less than about −2 or less than about −3.

The liquid crystal compound may also have optical anisotropy (Δn) of about 0.01 or more, or about 0.04 or more. In another example, the optical anisotropy of the liquid crystal compound may be about 0.3 or less, or about 0.27 or less.

Liquid crystal compounds that can be used as liquid crystal hosts for guest host liquid crystal layers are well known to those skilled in the art, and the liquid crystal compound can be selected freely from them.

The liquid crystal layer comprises a dichroic dye guest together with the liquid crystal host. The term dye may mean a material capable of intensively absorbing and/or modifying light in at least a part or the entire range in a visible light region, for example, a wavelength range of 380 nm to 780 nm, and the term dichroic dye guest may mean a material capable of absorbing light in at least a part or the entire range of the visible light region.

As the dichroic dye guest, for example, known dyes known to have properties that can be aligned according to the aligned state of the liquid crystal host may be selected and used. For example, azo dyes or anthraquinone dyes and the like may be used as the dichroic dye guest, and the liquid crystal layer may also comprise one or two or more dyes in order to achieve light absorption in a wide wavelength range.

A dichroic ratio of the dichroic dye guest can be appropriately selected in consideration of the use purpose of the dichroic dye guest. For example, the dichroic dye guest may have a dichroic ratio of about 5 or more to about 20 or less. The term dichroic ratio may mean a value obtained by dividing absorption of polarized light parallel to the long axis direction of the dye by absorption of polarized light parallel to the direction perpendicular to the long axis direction, in the case of a p-type dye. The dichroic dye guest may have the dichroic ratio in at least one wavelength, some range of wavelengths or full range of wavelengths within the wavelength range of the visible light region, for example, within the wavelength range of about 380 nm to about 780 nm or about 400 nm to about 700 nm.

The content of the dichroic dye guest in the liquid crystal layer may be appropriately selected in consideration of the use purpose of the dichroic dye guest. For example, the content of the dichroic dye guest may be selected in a range of about 0.1 to about 10 wt % based on the total weight of the liquid crystal host and the dichroic dye guest. The ratio of the dichroic dye guest may be changed in consideration of the desired transmittance and the solubility of the dichroic dye guest in the liquid crystal host, and the like.

The liquid crystal layer basically comprises the liquid crystal host and the dichroic dye guest, and may further comprise other optional additives according to a known form, if necessary. As an example of the additive, a chiral dopant or a stabilizer can be exemplified, without being limited thereto.

The liquid crystal layer may have an anisotropy degree (R) of about 0.5 or more. The anisotropy degree (R) is determined from absorbance (E(p)) of a light beam polarized parallel to the alignment direction of the liquid crystal host and absorbance (E(s)) of a light beam polarized perpendicularly to the alignment direction of the liquid crystal host according to the following equation.

<Anisotropy Degree Equation>

$$\text{Anisotropy degree } (R)=[E(p)-E(s)]/[E(p)+2*E(s)]$$

The above-used reference is another identical apparatus that does not contain a dye in the liquid crystal layer.

Specifically, the anisotropy degree (R) may be determined from the value (E(p)) for the absorbance of the liquid crystal layer in which the dye molecules are horizontally oriented and the value (E(s)) for the absorbance of the same liquid crystal layer in which the dye molecules are vertically oriented. The absorbance is measured in comparison with a liquid crystal layer which does not contain any dye at all but has the same constitution. This measurement may be performed, in the case of one vibration plane, using a polarized beam vibrating in a direction parallel to the alignment direction (E(p)) and vibrating in a direction perpendicular to the alignment direction (E(s)) in subsequent measurements. The liquid crystal layer is not switched or rotated during the measurement, and thus the measurement of E(p) and E(s) may be performed by rotating the vibration plane of the polarized incident light.

One example of a detailed procedure is as described below. The spectra for the measurement of E(p) and E(s) can be recorded using a spectrometer such as a Lambda 1050 UV spectrometer from Perkin Elmer. The spectrometer is equipped with Glan-Thompson polarizers for a wavelength range of about 250 nm to about 2500 nm in both of the measuring beam and the reference beam. The two polarizers are controlled by a stepping motor and are oriented in the same direction. The change in the polarizer direction of the polarizer, for example, the conversion of 0 degrees to 90 degrees, is always performed synchronously and in the same direction with respect to the measuring beam and the reference beam. The orientation of the individual polarizers may be measured using the method described in T. Karstens' 1973 thesis in the University of Wurzburg.

In this method, the polarizer is rotated stepwise by 5 degrees with respect to the oriented dichroic sample, and the absorbance is recorded, for example, at a fixed wavelength in the maximum absorption region. A new zero line is executed for each polarizer position. For the measurement of two dichroic spectra E(p) and E(s), anti-parallel-rubbed test cells coated with polyimide AL-1054 from JSR are located in the measuring beam and the reference beam. Two test cells can be selected with the same layer thickness. The test cell containing a pure host (liquid crystal compound) is placed in the reference beam. The test cell containing a solution of a dye in the liquid crystals is placed in the measuring beam. Two test cells for the measuring beam and the reference beam are installed in a ray path in the same alignment direction. In order to ensure the maximum possible accuracy of the spectrometer, E(p) may be in its maximum absorption wavelength range, for example, a wavelength range of about 0.5 to about 1.5. This corresponds to transmittance of 30% to 5%. This is set by correspondingly adjusting the layer thickness and/or the dye concentration.

The anisotropy degree (R) can be calculated from the measured values of E(p) and E(s) according to the above equation as shown in a reference [see: "Polarized Light in Optics and Spectroscopy," D. S. Kliger et al., Academic Press, 1990].

In another example, the anisotropy degree (R) may be about 0.55 or more, 0.6 or more, or about 0.65 or more. The anisotropy degree (R) may be, for example, about 0.9 or less, 0.85 or less, 0.8 or less, 0.75 or less, or about 0.7 or less.

Such an anisotropy degree (R) can be achieved by controlling the kind of the liquid crystal layer, for example, the kind of the liquid crystal compound (host), the kind and the ratio of the dichroic dye guest, or the thickness of the liquid crystal layer, and the like.

It is possible to provide an optical device with high contrast ratio by increasing the difference in the transmittance between the transparent mode and the black mode while using lower energy through the anisotropy degree (R) in the above range.

The thickness of the liquid crystal layer may be appropriately selected in consideration of, for example, the desired anisotropy degree or the like. In one example, the thickness of the liquid crystal layer may be about 0.01 µm or more, 0.05 µm or more, 0.1 µm or more, 0.5 µm or more, 1 µm or more, 1.5 µm or more, 2 µm or more, 2.5 µm or more, 3 µm or more, 3.5 µm or more, 4 µm or more, 4.5 µm or more, 5 µm or more, 5.5 µm or more, 6 µm or more, 6.5 µm or more, 7 µm or more, 7.5 µm or more, 8 µm or more, 8.5 µm or more, 9 µm or more, or about 9.5 µm or more. By controlling the thickness in this manner, it is possible to realize an optical device having a large difference in transmittance between the transparent mode and the black mode, that is, a device having a large contrast ratio. The thicker the thickness is, the higher the contrast ratio can be realized, and thus it is not particularly limited, but it may be generally about 30 µm or less, 25 µm or less, 20 µm or less, or about 15 µm or less.

In one example, the first and second oriented states may be each selected from a horizontal orientation, vertical orientation, twisted nematic orientation, or cholesteric orientation state. For example, in the black mode, the liquid crystal element or the liquid crystal layer may be at least in horizontal orientation, twisted nematic orientation or cholesteric orientation, and in the transparent mode, the liquid crystal element or liquid crystal layer may be in a vertically oriented state, or a horizontally oriented state having optical axes of directions different from the horizontal orientation of the black mode. The liquid crystal element may be an element of a normally black mode in which the black mode is implemented in a state where a voltage is not applied, or may implement a normally transparent mode in which the transparent mode is implemented in a state where a voltage is not applied.

A method of confirming which direction the optical axis of the liquid crystal layer is formed in the oriented state of the liquid crystal layer is known. For example, the direction of the optical axis of the liquid crystal layer can be measured by using another polarizing plate whose optical axis direction is known, which can be measured using a known measuring instrument, for example, a polarimeter such as P-2000 from Jasco.

A method of realizing the liquid crystal element of the normally transparent mode or black mode by adjusting the dielectric constant anisotropy of the liquid crystal host or the alignment direction of the alignment film, which is described below, for orienting the liquid crystal host, and the like is known.

The liquid crystal element may comprise two base films disposed opposite to each other and the liquid crystal layer provided between the two base films.

In addition, the liquid crystal element may further comprise spacers for maintaining an interval of the two base films between the two base films and/or a sealant for attaching the base films in a state where the interval of two base films disposed opposite to each other is maintained. As the material of the spacer and/or the sealant, a known material can be used without any particular limitation.

As the base film, for example, an inorganic film such as glass, or a plastic film can be used. As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthalate) film; a PET (polyethyleneterephtalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a functional layer such as an antireflection layer may also be present on the base film, if necessary.

As the base film, a film having a phase difference in a predetermined range may be used. In one example, the base film may have a front phase difference of about 100 nm or less. In another example, the front phase difference may be about 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, or about 10 nm or less. In another example, the front phase difference may be about 0 nm or more, 1 nm or more, 2 nm or more, 3 nm or more, 4 nm or more, 5 nm or more, 6 nm or more, 7 nm or more, 8 nm or more, 9 nm or more, or about 9.5 nm or more.

An absolute value of a thickness direction phase difference of the base film may be, for example, about 200 nm or less. The absolute value of the thickness direction phase difference may be about 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, or about 80 nm or less, and may be about 0 nm or more, 10 nm or more, 20 nm or more, 30 nm or more, 40 nm or more, 50 nm or more, 60 nm or more, 70 nm or more, or about 75 nm or more. The thickness direction phase difference may be negative, or may be positive, if the absolute value is within the above range, and for example, may be negative.

In this specification, the front phase difference (Rin) is a numerical value calculated by Equation 1 below, and the thickness direction phase difference (Rth) is a numerical value calculated by Equation 2 below. Unless otherwise specified, the reference wavelength of the front and thickness direction phase differences is about 550 nm.

Front phase difference $(Rin) = d \times (nx - ny)$ [Equation 1]

Thickness direction phase difference $(Rth) = d \times (nz - ny)$ [Equation 2]

In Equations 1 and 2, d is the thickness of the base film, nx is the refractive index in the slow axis direction of the base film, ny is the refractive index in the fast axis direction of the base film, and nz is the refractive index in the thickness direction of the base film.

When the base film is optically anisotropic, the angle formed by the slow axes of the base films disposed opposite to each other may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel.

In addition, the angle formed by the slow axis of the base film and a light absorption axis of a polarizer to be described below may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel, or may be in a range of about 80 degrees to about 100 degrees, in a range of about 83 degrees to about 97 degrees, in a range of about 85 degrees to about 95 degrees or in a range of about 87 degrees to about 92 degrees, or may be approximately vertical.

It is possible to realize the optically excellent and uniform transparent mode and black mode through the phase difference adjustment or the arrangement of the slow axes.

The base film may have a coefficient of thermal expansion of about 100 ppm/K or less. In another example, the coefficient of thermal expansion may be about 95 ppm/K or less, 90 ppm/K or less, 85 ppm/K or less, 80 ppm/K or less, 75 ppm/K or less, 70 ppm/K or less, or about 65 ppm/K or less, or may be about 10 ppm/K or more, 20 ppm/K or more, 30 ppm/K or more, 40 ppm/K or more, 50 ppm/K or more, or about 55 ppm/K or more. For example, the coefficient of thermal expansion of the base film may be measured in accordance with the provisions of ASTM D696, may be calculated by tailoring the film in the form provided in the relevant standard and measuring the change in length per unit temperature, or may be measured by a known method such as TMA (thermomechanic analysis).

As the base film, a base film having an elongation at break of about 90% or more may be used. The elongation at break may be about 95% or more, 100% or more, 105% or more, 110% or more, 115% or more, 120% or more, 125% or more, 130% or more, 135% or more, 140% or more, 145% or more, 150% or more, 155% or more, 160% or more, 165% or more, 170% or more, or about 175% or more, and may be about 1,000% or less, 900% or less, 800% or less, 700% or less, 600% or less, 500% or less, 400% or less, 300% or less, or about 200% or less. The elongation at break of the base film may be measured in accordance with ASTM D882 standard, and may be measured by tailoring the film in the form provided by the corresponding standard and using equipment capable of measuring stress-strain curve (capable of simultaneously measuring force and length).

By selecting the base film to have such a coefficient of thermal expansion and/or elongation at break, an optical device having excellent durability can be provided.

The thickness of the base film as above is not particularly limited, and for example, may be in a range of about 50 μm to about 200 μm or so.

Among physical properties mentioned herein, when the measuring temperature or pressure influences the result, the corresponding physical property is measured at normal temperature and normal pressure, unless otherwise specified.

The term normal temperature is a natural temperature without warming or cooling, which may be generally any one temperature in a range of about 10° C. to about 30° C., for example, a temperature of about 23° C. or about 25° C. or so. Unless otherwise specified, the unit of temperature in this specification is ° C.

The term normal pressure is a natural pressure without lowering or elevating, which generally means a pressure of about 1 atm or so, such as atmospheric pressure.

In the liquid crystal element, a conductive layer and/or an alignment film may be present on one side of the base film, for example, on the side facing the liquid crystal layer.

The conductive layer present on the side of the base film is a constitution for applying a voltage to the liquid crystal layer, to which a known conductive layer can be applied without any particular limitation. As the conductive layer, for example, a conductive polymer, a conductive metal, a conductive nanowire, or a metal oxide such as ITO (indium tin oxide) can be applied. Examples of the conductive layer that can be applied in the present application are not limited to the above, and all kinds of conductive layers known to be applicable to the liquid crystal element in this field can be used.

In one example, an alignment film exists on the side of the base film. For example, a conductive layer may first be formed on one side of the base film, and an alignment film may be formed on its upper part.

The alignment film is a constitution for controlling orientation of the liquid crystal host included in the liquid crystal layer, and a known alignment film can be applied without particular limitation. As the alignment film known in the industry, there is a rubbing alignment film or a photo alignment film, and the like, and the alignment film that can be used in the present application is the known alignment film, which is not particularly limited.

The alignment direction of the alignment film can be controlled to achieve the orientation of the above-described optical axis. For example, the alignment directions of two alignment films formed on each side of two base films disposed opposite to each other may form an angle in a range of about −10 degrees to about 10 degrees, an angle in a range of about −7 degrees to about 7 degrees, an angle in a range of about −5 degrees to about 5 degrees or an angle in a range of about −3 degrees to about 3 degrees to each other, or may be approximately parallel to each other. In another example, the alignment directions of the two alignment layers may form an angle in a range of about 80 degrees to about 100 degrees, an angle in a range of about 83 degrees to about 97 degrees, an angle in a range of about 85 degrees to about 95 degrees or an angle in a range of about 87 degrees to about 92 degrees, or may be approximately perpendicular to each other.

Since the direction of the optical axis of the liquid crystal layer is determined in accordance with such an alignment direction, the alignment direction can be known by checking the direction of the optical axis of the liquid crystal layer.

The shape of the liquid crystal element having such a structure is not particularly limited, which may be determined according to the application of the optical device, and is generally in the form of a film or a sheet.

The optical device may further comprise a polarizer together with the liquid crystal element. As the polarizer, for example, an absorbing linear polarizer, that is, a polarizer having a light absorption axis formed in one direction and a light transmission axis formed approximately perpendicular thereto may be used.

Assuming that the blocking state is implemented in the first oriented state of the liquid crystal layer, the polarizer may be disposed in the optical device such that the angle formed by an average optical axis (vector sum of optical axes) of the first oriented state and the light absorption axis of the polarizer is about 80 degrees to about 100 degrees or about 85 degrees to about 95 degrees, or it is approximately perpendicular, or may be disposed in the optical device such that it is about 35 degrees to about 55 degrees or about 40 degrees to about 50 degrees or approximately 45 degrees.

When the alignment direction of the alignment film is used as a reference, the alignment directions of the alignment films formed on each side of the two base films disposed opposite to each other as described above may form, to each other, an angle in a range of about −10 degrees to about 10 degrees, an angle in a range of about −7 degrees to about 7 degrees, an angle in a range of about −5 degrees to about 5 degrees or an angle in a range of about −3 degrees to about 3 degrees, or in the case of being approximately parallel to each other, the angle formed by the alignment direction of any one of the two alignment films and the light absorption axis of the polarizer may be about 80 degrees to about 100 degrees or about 85 degrees to about 95 degrees, or may be approximately perpendicular.

In another example, the alignment directions of the two alignment films may form an angle in a range of about 80 degrees to about 100 degrees, an angle in a range of about 83 degrees to about 97 degrees, an angle in a range of about 85 degrees to about 95 degrees or an angle in a range of about 87 degrees to about 92 degrees, or in the case of being approximately vertical to each other, the angle formed by the alignment direction of the alignment film disposed closer to the polarizer of the two alignment films and the light absorption axis of the polarizer may be about 80 degrees to about 100 degrees or about 85 degrees to about 95 degrees, or may be approximately perpendicular.

For example, as shown in FIG. 1, the liquid crystal element (10) and the polarizer (20) may be disposed in a state of being laminated on each other such that the optical axis (average optical axis) of the first alignment direction in the liquid crystal element (10) and the light absorption axis of the polarizer (20) become the above relationship.

The kind of the polarizer that can be applied in the optical device of the present application is not particularly limited. For example, as the polarizer, a conventional material used in conventional LCDs or the like, such as a PVA (poly(vinyl alcohol)) polarizer, or a polarizer implemented by a coating method such as a polarizing coating layer comprising lyotropic liquid crystals (LLCs) or reactive mesogens (RMs) and a dichroic dye can be used. In this specification, the polarizer implemented by the coating method as described above may be referred to as a polarizing coating layer. As the lyotropic liquid crystal, a known liquid crystal may be used without any particular limitation, and for example, a lyotropic liquid crystal capable of forming a lyotropic liquid crystal layer having a dichroic ratio of about 30 to about 40 or so may be used. On the other hand, when the polarizing coating layer contains reactive mesogens (RMs) and a dichroic dye, as the dichroic dye, a linear dye may be used, or a discotic dye may also be used.

The optical device of the present application may comprise only each one of the liquid crystal element and the polarizer as described above. Thus, the optical device may comprise only one liquid crystal element and may comprise only one polarizer.

The optical device comprises two outer substrates disposed opposite to each other. In this specification, one of the two outer substrates may be referred to as a first outer substrate and the other may be referred to as a second outer substrate for the sake of convenience, but the first and second representations do not define the order or vertical relationship of the outer substrates. In one example, the polarizer included together with the liquid crystal element may be located between the two outer substrates. For example, as shown in FIG. 2, the liquid crystal element (10) and the polarizer (20) may exist between the two outer substrates (30) disposed opposite to each other.

As the outer substrate, for example, an inorganic substrate such as glass, or a plastic substrate can be used. As the plastic substrate, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthalate) film; a PET (polyethyleneterephtalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a functional layer such as an antireflection layer may also be present on the outer substrate, if necessary.

As the outer substrate, a substrate having a phase difference in a predetermined range may be used. In one example, the outer substrate may have a front phase difference of about 100 nm or less. In another example, the front phase difference may be about 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, or about 10 nm or less. In another example, the front phase difference may be about 0 nm or more, 1 nm or more, 2 nm or more, 3 nm or more, 4 nm or more, 5 nm or more, 6 nm or more, 7 nm or more, 8 nm or more, 9 nm or more, or about 9.5 nm or more.

An absolute value of a thickness direction phase difference of the outer substrate may be, for example, about 200 nm or less. The absolute value of the thickness direction phase difference may be about 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, or about 80 nm or less, and may be about 0 nm or more, 5 nm or more, 10 nm or more, 20 nm or more, 30 nm or more, 40 nm or more, 50 nm or more, 60 nm or more, 70 nm or more, or about 75 nm or more. The thickness direction phase difference may be negative, or may be positive, if the absolute value is within the above range, and for example, may be negative.

The front phase difference (Rin) and the thickness direction phase difference (Rth) of the outer substrate may be calculated in the same manner, except that in Equations 1 and 2 above, the thickness (d), the refractive index in the slow axis direction (nx), the refractive index in the fast axis direction (ny) and the refractive index in the thickness direction (nz), of the base film are substituted with the thickness (d), the refractive index in the slow axis direction (nx), the refractive index in the fast axis direction (ny) and the refractive index in the thickness direction (nz), of the outer substrate, respectively, to calculate them.

When the outer substrate is optically anisotropic, the angle formed by the slow axes of the outer substrates disposed opposite to each other may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel.

In addition, the angle formed by the slow axis of the outer substrate and, in the case where the above-described base film is optically anisotropic, the slow axis of the base film may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel, or may be in a range of about 80 degrees to about 100 degrees, in a range of about 83 degrees to about 97 degrees, in a range of about 85 degrees to about 95 degrees or in a range of about 87 degrees to about 92 degrees, or may be approximately vertical.

It is possible to realize the optically excellent and uniform transparent mode and black modes through the phase difference adjustment or the arrangement of the slow axes.

As the outer substrate, a substrate having a coefficient of thermal expansion of about 100 ppm/K or less may be used. In another example, the coefficient of thermal expansion may be about 95 ppm/K or less, 90 ppm/K or less, 85 ppm/K or less, 80 ppm/K or less, 75 ppm/K or less, 70 ppm/K or less, 65 ppm/K or less, 60 ppm/K or less, 50 ppm/K or less, 40 ppm/K or less, 30 ppm/K or less, 20 ppm/K or less, or about 15 ppm/K or less, or may be about 1 ppm/K or more, 2 ppm/K or more, 3 ppm/K or more, 4 ppm/K or more, 5 ppm/K or more, 6 ppm/K or more, 7 ppm/K or more, 8 ppm/K or more, 9 ppm/K or more, or about 10 ppm/K or more.

The method of measuring the coefficient of thermal expansion of the outer substrate is the same as the method of measuring the coefficient of thermal expansion of the base film as described above.

By selecting the outer substrate to have such a coefficient of thermal expansion, an optical device having excellent durability can be provided.

The thickness of the outer substrate as above is not particularly limited, and for example, may be about 0.3 mm or more. In another example, the thickness may be about 0.5 mm or more, 1 mm or more, 1.5 mm or more, or about 2 mm or more or so, and may also be about 10 mm or less, 9 mm or less, 8 mm or less, 7 mm or less, 6 mm or less, 5 mm or less, 4 mm or less, or about 3 mm or less or so.

The outer substrate may be a flat substrate or may be a substrate having a curved surface shape. For example, the two outer substrates may be simultaneously flat substrates, simultaneously have a curved surface shape, or any one may be a flat substrate and the other may be a substrate having a curved surface shape.

Here, in the case of having the curved surface shape at the same time, the respective curvatures or curvature radii may also be the same or different.

In this specification, the curvature or curvature radius may be measured in a manner known in the industry, and for example, may be measured using a contactless apparatus such as a 2D profile laser sensor, a chromatic confocal line sensor or a 3D measuring confocal microscopy. The method of measuring the curvature or curvature radius using such an apparatus is known.

In addition, with respect to the outer substrate, for example, when the curvatures or the curvature radii at the front surface and the back surface are different from each other, the curvatures or curvature radii of the respective facing surfaces, that is, the curvature or curvature radius of the surface facing a second outer substrate in the case of a first outer substrate and the curvature or curvature radius of the surface facing the first outer substrate in the case of the second outer substrate may be a reference. Furthermore, when the relevant surface has portions that the curvatures or curvature radii are not constant and different, the largest curvature or curvature radius may be a reference, the smallest curvature or curvature radius may be a reference, or the average curvature or average curvature radius may be a reference.

Both of the two outer substrates may have a difference in curvature or curvature radius within about 10%, within 9%, within 8%, within 7%, within 6%, within 5%, within 4%, within 3%, within 2% or within about 1%. When a large curvature or curvature radius is $C_L$ and a small curvature or curvature radius is $C_S$, the difference in curvature or curvature radius is a value calculated by $100 \times (C_L - C_S)/C_S$. In addition, the lower limit of the difference in curvature or curvature radius is not particularly limited. Since the differences in curvatures or curvature radii of two outer substrates can be the same, the difference in curvature or curvature radius may be about 0% or more, or may be more than about 0%.

Such a curvature or curvature radius is useful in a structure in which a liquid crystal device and/or a polarizer are encapsulated with a plurality of curable adhesive films and a non-curable adhesive film to be described below. In the present application, the term sealing (or encapsulation) may mean covering the top surface of the liquid crystal element and/or the polarizer with an adhesive film.

When both the first and second outer substrates are curved surfaces, both curvatures may have the same sign. In other words, the two outer substrates may be bent in the same direction. That is, in the above case, both the center of curvature of the first outer substrate and the center of curvature of the second outer substrate exist in the same portion of the upper part and the lower part of the first and second outer substrates.

FIG. 3 is an exemplary view showing sides of an optical device that an encapsulation portion (400) comprising a liquid crystal element or the like is present between the first and second outer substrates (30), where the center of the curvature in both the first and second outer substrates (30) exists at the lower part in the drawing.

The specific range of each curvature or curvature radius of the first and second outer substrates is not particularly limited. In one example, the curvature radius of each substrate may be about 100R or more, 200R or more, 300R or more, 400R or more, 500R or more, 600R or more, 700R or more, 800R or more, or about 900R or more, or may be about 10,000R or less, 9,000R or less, 8,000R or less, 7,000R or less, 6,000R or less, 5,000R or less, 4,000R or less, 3,000R or less, 2,000R or less, 1,900R or less, 1,800R or less, 1,700R or less, 1,600R or less, 1,500R or less, 1,400R or less, 1,300R or less, 1,200R or less, 1,100R or less, or about 1,050R or less. Here, R denotes a degree of curvature of a circle having a radius of 1 mm. Thus, here, for example, 100R is the degree of curvature of a circle with a radius of 100 mm or the curvature radius for such a circle. Of course, in the case of a flat surface, the curvature is zero and the curvature radius is infinite.

The first and second outer substrates may have the same or different curvature radii in the above range. In one example, when the curvatures of the first and second outer substrates are different from each other, the curvature radius of the substrate having a large curvature among them may be within the above range.

In one example, when the curvatures of the first and second outer substrates are different from each other, a substrate having a large curvature among them may be a substrate that is disposed in the gravity direction upon using the optical device.

When the curvatures or curvature radii between the substrates are controlled as described above, the net force which is the sum of the restoring force and the gravity may act to prevent the widening and also to withstand the same process pressure as the autoclave, even if the adhesion force by the adhesive film is lowered.

The optical device of the present application comprises a plurality of adhesive films. The plurality of adhesive films may be a curable adhesive film and a non-curable adhesive film.

In the present application, the curable adhesive film means an adhesive film containing a component or a functional group capable of causing a chemical curing reaction, and the non-curable adhesive film means an adhesive film not containing a component or a functional group capable of causing a chemical curing reaction.

The curable adhesive film is not particularly limited, where a known curable adhesive film can be used. In one example, the curable adhesive film may be an ethylene-vinyl acetate adhesive film, or may comprise an epoxy adhesive resin, an acrylate adhesive resin or a silicone adhesive resin. In the case of the ethylene-vinyl acetate adhesive film, it may exist in the state of the adhesive film at room temperature before curing, which may be a so-called hot melt adhesive film. When the adhesive film is formed by using another epoxy adhesive resin, an acrylate adhesive resin or a silicone adhesive resin, the adhesive containing the resin may also be in the form of a film at room temperature or in a liquid phase, and the case of the liquid phase, it may form the adhesive film after curing.

The non-curable adhesive film is not particularly limited, where a known non-curable adhesive film can be used. In one example, the non-curable adhesive film may be a thermoplastic polyurethane adhesive film or a polyolefin adhesive film.

On the other hand, in the non-curable adhesive film, the absolute value of the thickness direction phase difference (Rth) may be, for example, about 50 nm or less. In another example, the absolute value may be about 45 nm or less, 40 nm or less, 35 nm or less, 30 nm or less, or about 25 nm or less, and may be about 0 nm or more, more than about 0 nm.

The thickness direction phase difference may be negative, or may be positive, if the absolute value is within the above range, and for example, may be negative.

The thickness direction phase difference (Rth) of the adhesive film may be calculated in the same manner, except that in Equation 2 above, the thickness (d), the refractive index in the fast axis direction (ny) and the refractive index in the thickness direction (nz), of the base film are substituted with the thickness (d), the refractive index in the fast axis direction (ny) and the refractive index in the thickness direction (nz), of the adhesive film to calculate it.

The liquid crystal element and/or the polarizer can be bonded and/or encapsulated by an autoclave process under high temperature and high pressure using the adhesive film. At this time, in the case of using only a plurality of curable adhesive films or non-curable adhesive films as the adhesive film, light loss may occur or optical device appearance defects may occur.

In one embodiment, when only the curable adhesive film (hereinafter, may be referred to as a first adhesive film) is used as the adhesive film, the light loss due to the adhesive film itself may occur. In one embodiment, when the absolute value of the thickness direction phase difference (Rth) of the curable adhesive film is 100 nm or more, light passing through the first adhesive film may be birefringent, and when the birefringent light passes through the optical element or the polarizer, only a part of the birefringent light by the adhesive film may pass through the optical element or the polarizer. Therefore, the light loss due to the first adhesive film itself may be generated by the light that has not passed through the optical element or the polarizer among the light that has passed through the first adhesive film.

On the other hand, when only the non-curable adhesive film (hereinafter, may be referred to as a second adhesive film) is used as the adhesive film, the non-curable adhesive film can be partially re-melted by high temperature and high pressure, and accordingly, appearance defects, such as widening between the outer substrate and the adhesive film or generating wrinkles or the like in the adhesive film, may occur in the optical device.

The above problem can be solved when the first adhesive film and the second adhesive film are plurally mixed and used. That is, the optical device is manufactured by using the first adhesive films and the second adhesive films in combination, whereby appearance defect occurrence of the optical device can be prevented and also the light loss can be reduced. Specifically, appearance defects, such as widening between the outer substrate and the adhesive film or generation of wrinkles or the like in the adhesive film, can be prevented by using the first adhesive film, and even when the absolute value of the thickness direction phase difference (Rth) of the first adhesive film is 100 nm or more, the light loss due to the adhesive film itself can be reduced by using the second adhesive film having an absolute value of the thickness direction phase difference (Rth) of 50 nm or less.

In the optical device of the present application, a number of curable adhesive films and non-curable adhesive films may be positioned between the first and second outer substrates which are disposed opposite to each other. In one example, a number of curable adhesive films and non-curable adhesive films may be positioned between the first outer substrate and the liquid crystal element and may be positioned between the second outer substrate and the liquid crystal element, or may all be positioned between the first outer substrate and the liquid crystal element and between the second outer substrate and the liquid crystal element.

In another example, as shown in FIG. 4, the first adhesive film (40a) may be positioned between the first outer substrate (30) and the liquid crystal element (10), and the second adhesive film (40b) may be positioned between the second outer substrate (30) and the liquid crystal element (10).

In another example, the first adhesive film may be positioned between the first outer substrate and the liquid crystal element, the second adhesive film may be positioned between the second outer substrate and the liquid crystal element, and the first adhesive film; the second adhesive film; or the first adhesive film and the second adhesive film may be positioned on the sides of the liquid crystal element, suitably, all the sides. In one embodiment, as shown in FIG. 5, the first adhesive film (40a) may be positioned between the first outer substrate (30) and the liquid crystal element (10), the second adhesive film (40b) may be positioned between the second outer film (30) and the liquid crystal element (10), and the first adhesive film (40a) and the second adhesive film (40b) may be positioned on the sides of the liquid crystal element (10).

The first and second adhesive films may bond the first outer substrate (30) and the liquid crystal element (10), and the liquid crystal element (10) and the second outer substrate (30) to each other and the first and/or second adhesive films may encapsulate the liquid crystal element (10) together.

When the optical device further comprises the above-described polarizer, a number of the curable adhesive films and the non-curable adhesive films may be positioned between the first outer substrate and the polarizer and may be positioned between the second outer substrate and the polarizer, or may all be positioned between the first outer substrate and the polarizer and between the second outer substrate and the polarizer.

In one example, as shown in FIG. 6, the first adhesive film (40a) may be positioned between the first outer substrate (30) and the liquid crystal element (10) and between the polarizer (20) and the second outer substrate (30), and the second adhesive film (40b) may be positioned between the liquid crystal element (10) and the polarizer (20).

In another example, the first adhesive film may be positioned between the first outer substrate and the liquid crystal element and between the polarizer and the second outer substrate, the second adhesive film may be positioned between the liquid crystal element and the polarizer, and the first adhesive film; the second adhesive film; or the first adhesive film and the second adhesive film may be positioned on the sides of the liquid crystal element and the polarizer, suitably, on all the sides. In one embodiment, as shown in FIG. 7, the first adhesive film (40a) may be positioned between the first outer substrate (30) and the liquid crystal element (10) and between the polarizer (20) and the second outer substrate (30), the second adhesive film (40b) may be positioned between the liquid crystal element (10) and the polarizer (20) and the first adhesive film (40a) may be positioned on the sides of the liquid crystal element (10) and the polarizer (20).

The first and second adhesive films may bond the first outer substrate (30) and the liquid crystal element (10), the liquid crystal element (10) and the polarizer (20), and the polarizer (20) and the second outer substrate (30) to each other, and the first and/or second adhesive films may encapsulate the liquid crystal element (10) and the polarizer (20) together.

The optical device, in which the first adhesive film (40a) and the second adhesive film (40b) are laminated in these positions, can more effectively prevent the appearance defect occurrence of the optical device, and can also more effectively reduce the light loss.

In one example, as a number of the curable adhesive films and the non-curable adhesive films, those having each a Young's modulus in a range of about 0.1 MPa to about 100 MPa may be used. The Young's modulus may be measured in the manner specified in ASTM D882, and may be measured by tailoring the film in the form provided by the corresponding standard and using equipment capable of measuring stress-strain curve (capable of simultaneously measuring force and length). By selecting the first and second adhesive films to have such a Young's modulus, an optical device with excellent durability can be provided.

In one example, the thicknesses of the plurality of the curable adhesive films and the non-curable adhesive films are not particularly limited, and for example, the thicknesses of the first and second adhesive films may each be within a range of about 200 µm to about 1,270 µm or so. In another example, here, the thickness of the first adhesive film (40a) may be the thickness between the outer substrate (30) and the liquid crystal element (10), for example, the distance between the two, or may be the thickness between the polarizer (20) and the outer substrate (30), for example, the distance between the two. Here, the thickness of the second adhesive film (40b) may be the thickness between the liquid crystal element (10) and the polarizer (20), for example, the distance between the two.

The optical device may further comprise a buffer layer. Such a buffer layer may be present on one side or both sides of the liquid crystal element. FIG. 8 shows a structure in which the buffer layer (50) is present on both sides of the liquid crystal element (10), but the buffer layer (50) may also be present only on one side of the liquid crystal element (10).

Such a buffer layer can mitigate the negative pressure caused by the difference in the coefficient of thermal expansion between layers in a structure in which the liquid crystal element is encapsulated by the first and/or second adhesive films, and enable so that a more durable device can be realized.

In one example, as the buffer layer, a layer having a Young's modulus of about 1 MPa or less may be used. In another example, the Young's modulus of the buffer layer may be about 0.9 MPa or less, 0.8 MPa or less, 0.7 MPa or less, 0.6 MPa or less, 0.5 MPa or less, 0.4 MPa or less, 0.3 MPa or less, 0.2 MPa or less, 0.1 MPa or less, 0.09 MPa or less, 0.08 MPa or less, 0.07 MPa or less, or about 0.06 MPa or less. In another example, the Young's modulus is about 0.001 MPa or more, 0.002 MPa or more, 0.003 MPa or more, 0.004 MPa or more, 0.005 MPa or more, 0.006 MPa or more, 0.007 MPa or more, 0.008 MPa or more, 0.009 MPa or more, 0.01 MPa or more, 0.02 MPa or more, 0.03 MPa or more, 0.04 MPa or more, or about 0.045 MPa or more. Here, the measurement method of the Young's modulus is the same as the above-mentioned measuring method of the adhesive film.

As a specific kind of the buffer layer, a transparent material showing the above-mentioned Young's modulus may be used without particular limitation, and for example, an acrylate-based, urethane-based, rubber-based or silicon-based oligomer or polymer material, and the like can be used.

The thickness of the buffer layer is not particularly limited, which may be selected within a range that can effectively reduce the negative pressure generated inside the device by exhibiting the Young's modulus in the above range.

The optical device may further comprise any necessary configuration other than the above configurations, and for example, comprise a known configuration such as a retardation layer, an optical compensation layer, an antireflection layer or a hard coating layer in a proper position.

The present application also relates to an optical device comprising a first outer substrate; a second outer substrate; a liquid crystal element positioned between the first outer substrate and the second outer substrate; a polarizer positioned between the second outer substrate and the liquid crystal element; and a plurality of adhesive films encapsulating the liquid crystal element and the polarizer between the first and second outer substrates, wherein the plurality of adhesive films comprise a curable adhesive film and a non-curable adhesive film, and the non-curable adhesive film is positioned between the liquid crystal element and the polarizer.

On the other hand, in the non-curable adhesive film (or the second adhesive film), the absolute value of the thickness direction phase difference (Rth) may be 50 nm or less.

By positioning the non-curable adhesive film having an absolute value of a thickness direction phase difference (Rth) of 50 nm or less between the liquid crystal element and the polarizer, the light loss due to the adhesive film itself can be more effectively reduced.

On the other hand, the curable adhesive film may be positioned at one or more places selected from the group consisting of the gap between the second outer substrate and the polarizer, and the gap between the first outer substrate and the liquid crystal element.

The non-curable adhesive film (or the second adhesive film) can be partially re-melted under high temperature and high pressure, so that when the second adhesive film is positioned at one or more places selected from the group consisting of the gap between the second outer substrate and the polarizer and the gap between the first outer substrate and the liquid crystal element, the appearance defects, such as widening between the outer substrate and the adhesive film, or generation of wrinkles or the like in the adhesive film, may occur in the optical device. However, the curable adhesive film (or the first adhesive film) does not cause re-melting by high temperature and high pressure. Therefore, when the first adhesive film is positioned at one or more places selected from the group consisting of the gap between the second outer substrate and the polarizer, and the gap between the first outer substrate and the liquid crystal element, the appearance defect occurrence of the optical device can be more effectively prevented.

The method of manufacturing the optical device of the present application is not particularly limited. In one example, the optical device may be manufactured through a step of bonding a liquid crystal element between first and second outer substrates which are disposed opposite to each other using a plurality of adhesive films including a curable adhesive film and a non-curable adhesive film.

The curable adhesive film and the non-curable adhesive film may be the first adhesive film and the second adhesive film as described above.

Here, the bonding method is not particularly limited, and a known bonding method can be used. In one example, the bonding method may use an autoclave process.

The autoclave process can be performed by arranging the plurality of curable adhesive films and non-curable adhesive film, the liquid crystal element and/or the polarizer between the outer substrates according to the desired structure, and heating/pressing them.

For example, an optical device as shown in FIG. 4 can be formed by heating/pressing a laminate, in which an outer substrate (30), a first adhesive film (40a), a liquid crystal element (10), a second adhesive film (40b) and an outer substrate (30) are arranged in this order, in an autoclave process. Alternatively, an optical device as shown in FIG. 5 can be formed by heating/pressing a laminate, in which an outer substrate (30), a first adhesive film (40a), a liquid crystal element (10), a second adhesive film (40b) and an outer substrate (30) are arranged in this order and a first adhesive film (40a) and a second adhesive film (40b) are also disposed on the sides of the liquid crystal element (10), in an autoclave process.

In addition, for example, an optical device as shown in FIG. 6 can be formed by heating/pressing a laminate, in which an outer substrate (30), a first adhesive film (40a), a liquid crystal element (10), a second adhesive film (40b), a polarizer (20), a first adhesive film (40a) and an outer substrate (30) are arranged in this order, in an autoclave process. Alternatively, an optical device as shown in FIG. 7 can be formed by heating/pressing a laminate, in which an outer substrate (30), a first adhesive film (40a), a liquid crystal element (10), a second adhesive film (40b), a polarizer (20), a first adhesive film (40a) and an outer substrate (30) are arranged in this order and a first adhesive film (40a) and a second adhesive film (40b) are also disposed on the sides of the liquid crystal element (10) and the polarizer (20), in an autoclave process.

The conditions of the autoclave process are not particularly limited, and for example, the process can be performed under appropriate temperature and pressure depending on the kind of the applied first and second adhesive films. The temperature of a typical autoclave process is about 80° C. or more, 90° C. or more, or about 100° C. or more, and the pressure is about 2 atm or more, without being limited thereto. The upper limit of the process temperature may be about 200° C. or less, 190° C. or less, 180° C. or less, or about 170° C. or less or so, and the upper limit of the process pressure may be about 10 atm or less, 9 atm or less, 8 atm or less, 7 atm or less, or about 6 atm or less or so.

In the optical device, by laminating the first adhesive film (40a) and the second adhesive film (40b) in the positions as above and manufacturing the optical device by the autoclave process, the appearance defect occurrence of the optical device can be more effectively prevented and also the light loss can be more efficiently reduced. Such an optical device can be used for various applications, and for example, can be used for eyewear such as sunglasses or AR (augmented reality) or VR (virtual reality) eyewear, an outer wall of a building; or a sunroof for a vehicle, and the like.

In one example, the optical device itself may be a sunroof for a vehicle.

For example, in an automobile including a body in which at least one opening is formed, the optical device or the sunroof for a vehicle attached to the opening can be mounted and used.

Advantageous Effects

The present application can provide an optical device capable of varying transmittance and reducing light loss while improving appearance defects. Such an optical device can be used for various applications such as eyewear, for example, sunglasses or AR (augmented reality) or VR (virtual reality) eyewear, an outer wall of a building or a sunroof for a vehicle.

MODE FOR INVENTION

Hereinafter, the present application will be described in detail through Example 1 and Comparative Example 1, but the scope of the present application is not limited to the following Example 1.

Method of Measuring Appearance Defects

Appearance defects were measured by applying the optical devices manufactured in Example 1 and Comparative Example 1 to a high temperature long term durability test (maintained at a temperature of 100° C. for about 168 hours) and confirming whether or not wrinkles were generated on the appearance of the optical device.

Example 1

An optical device was produced by encapsulating a guest-host liquid crystal element (cell gap: about 12 µm, base film type: PET (poly(ethylene terephthalate) film), liquid crystal/dye mixture type: mixture of MAT-16-969 liquid crystals from Merck and a dichroic dye (BASF, X12)) as a liquid crystal element and a PVA (polyvinyl alcohol)-based polarizer between two outer substrates with a curable adhesive film and a non-curable adhesive film.

The used curable adhesive film (first adhesive film) was an ethylene vinyl acetate adhesive film (thickness: about 400 µm, manufacturer: SKC, product name: EF2N) and the used non-curable adhesive film (second adhesive film) was a thermoplastic polyurethane adhesive film (thickness: about 0.38 mm, manufacturer: Argotec, product name: ArgoFlex) having an absolute value of a thickness direction phase difference (Rth) of about 15 nm.

Here, as the outer substrates, glass substrates having a thickness of about 3 mm or so were used, where a substrate having a curvature radius of about 2,470R (first outer substrate) and a substrate having a curvature radius of about 2,400R (second outer substrate) were used.

A laminate was produced by laminating the first outer substrate, the first adhesive film, the liquid crystal element, the second adhesive film, the polarizer, the first adhesive film and the second outer substrate in this order, and disposing the first adhesive film on all sides of the liquid crystal element and the polarizer (the second outer substrate was arranged in the gravity direction as compared to the first outer substrate).

Thereafter, the optical device was produced by performing an autoclave process at a temperature of about 100° C. and a pressure of about 2 atm or so.

Comparative Example 1

An optical device was produced in the same manner as in Example 1, except that the second adhesive film was used between the first outer substrate and the liquid crystal element and between the polarizer and the second outer substrate instead of the first adhesive film, and the second adhesive film was used instead of the first adhesive film on all sides of the liquid crystal element and the polarizer.

FIGS. 9A-B are device photographs after the durability test, where FIG. 9A is the device photograph of Example 1 and FIG. 9B is the device photograph of Comparative Example 1. It can be confirmed that the device of Example 1 has been stably produced without causing appearance defects such as wrinkles at the edges, and in contrast, it can be confirmed that in the device of Comparative Example 1, appearance defects such as wrinkles at the edges have occurred.

The invention claimed is:

1. An optical device comprising:
   a first outer substrate and a second outer substrates disposed opposite to each other;
   a liquid crystal element disposed between the first and second outer substrates; and
   a plurality of adhesive films encapsulating the liquid crystal element,
   wherein the plurality of adhesive films comprises at least one curable adhesive film and a non-curable adhesive film.

2. The optical device according to claim 1, wherein the first and second outer substrates are a glass substrate.

3. The optical device according to claim 1, wherein a difference in curvature of the first and second outer substrates is less than 10%.

4. The optical device according to claim 1, wherein the liquid crystal element comprises:
   a liquid crystal layer, wherein the liquid crystal layer comprises a liquid crystal host and a dichroic dye guest, and
   wherein the liquid crystal layer is capable of switching between a first oriented state and a second oriented state.

5. The optical device according to claim 1, wherein the liquid crystal element comprises:
   two base films, and
   a liquid crystal layer disposed between the two base films.

6. The optical device according to claim 5, wherein each of the two base films further comprises a conductive layer or an alignment film on a surface facing the liquid crystal layer.

7. The optical device according to claim 1, wherein the at least one curable adhesive film is an ethylene-vinyl acetate adhesive film, or comprises an epoxy adhesive resin, an acrylate adhesive resin or a silicone adhesive resin.

8. The optical device according to claim 1, wherein the non-curable adhesive film is a thermoplastic polyurethane adhesive film or a polyolefin adhesive film.

9. The optical device according to claim 1, wherein the non-curable adhesive film has an absolute value of a thickness direction phase difference (Rth) of 50 nm or less.

10. The optical device according to claim 1, wherein the at least one curable adhesive film comprises a first curable adhesive film and a second curable adhesive film, wherein the first curable adhesive film is disposed between the first outer substrate and the liquid crystal element, and the second curable adhesive film is disposed between the second outer substrate and the liquid crystal element.

11. The optical device according to claim 1, further comprising:
a polarizer disposed between the first and second outer substrates.

12. An optical device comprising:
a first outer substrate;
a second outer substrate;
a liquid crystal element disposed between the first outer substrate and the second outer substrate;
a polarizer disposed between the second outer substrate and the liquid crystal element; and
a plurality of adhesive films encapsulating the liquid crystal element and the polarizer
wherein the plurality of adhesive films comprises at least one curable adhesive film and a non-curable adhesive film, and
wherein the non-curable adhesive film is disposed between the liquid crystal element and the polarizer.

13. The optical device according to claim 12, wherein the non-curable adhesive film has an absolute value of a thickness direction phase difference (Rth) of 50 nm or less.

14. The optical device according to claim 12, wherein the at least one curable adhesive film is disposed between at least one of the second outer substrate and the polarizer, or the first outer substrate and the liquid crystal element.

15. The optical device according to claim 14, the at least one curable adhesive film is disposed between the second outer substrate and the polarizer, and
wherein the non-curable adhesive film and the at least one curable adhesive film encapsulate the polarizer.

16. The optical device according to claim 14, wherein the at least one curable adhesive film is disposed between the first outer substrate and the liquid crystal element, and
wherein the non-curable adhesive film and the at least one curable film encapsulate the liquid crystal element.

17. A method of manufacturing an optical device comprising:
bonding a liquid crystal element to a first outer substrate and a second outer substrates using a plurality of adhesive films including a curable adhesive film and a non-curable adhesive film, wherein the liquid crystal element is disposed between the first and second outer substrates.

18. An automobile comprising:
a body having one or more openings; and
the optical device of claim 1 mounted on the openings.

* * * * *